(12) United States Patent
Singh et al.

(10) Patent No.: US 10,817,584 B2
(45) Date of Patent: Oct. 27, 2020

(54) SYSTEM AND METHOD FOR GROUPING AND SHARING SOCIAL MEDIA DATA

(71) Applicant: Glu, Inc., Phoenix, AZ (US)

(72) Inventors: Vivek Singh, New York, NY (US);
Jacob Shampine, Tempe, AZ (US);
Marshall Winters, New Orleans, LA (US)

(73) Assignee: Glu, Inc., New York, NY (US)

( * ) Notice: Subject to any disclaimer, the term of this patent is extended or adjusted under 35 U.S.C. 154(b) by 0 days.

(21) Appl. No.: 16/163,837

(22) Filed: Oct. 18, 2018

(65) Prior Publication Data

US 2019/0121913 A1     Apr. 25, 2019

Related U.S. Application Data

(60) Provisional application No. 62/574,280, filed on Oct. 19, 2017.

(51) Int. Cl.
*G06F 16/955*     (2019.01)
*G06K 19/06*      (2006.01)
*G06Q 50/00*      (2012.01)
*G06F 16/951*     (2019.01)

(52) U.S. Cl.
CPC ........ *G06F 16/9554* (2019.01); *G06F 16/951* (2019.01); *G06K 19/06037* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 8,095,534 B1* | 1/2012 | Alexander | G06F 16/972 707/722 |
| 2005/0233697 A1 | 10/2005 | Yu | |
| 2012/0191693 A1* | 7/2012 | Alexander | G06F 21/30 707/709 |
| 2013/0043302 A1* | 2/2013 | Powlen | G06Q 50/01 235/375 |
| 2013/0186954 A1* | 7/2013 | Denny | G06F 17/00 235/375 |
| 2013/0233916 A1* | 9/2013 | Tran | G06K 19/06037 235/375 |
| 2014/0025676 A1* | 1/2014 | Alexander | G06Q 10/10 707/736 |
| 2019/0332839 A1* | 10/2019 | Papazian | G06K 19/06037 |

OTHER PUBLICATIONS

Berners-Lee et al.; Uniform Resource Identifiers (URI): Generic Syntax; The Internet Society (Aug. 1998); pp. 1-40.

* cited by examiner

*Primary Examiner* — Thomas J Dailey
(74) *Attorney, Agent, or Firm* — The Webb Law Firm (57) ABSTRACT

A system and method for sharing communication platform data includes displaying on a screen of a mobile device data fields a QR code and visual indicia corresponding to contact information corresponding to a user of the mobile device. The user selects which contact information is to be shared by selecting or unselecting the corresponding visual indicia and the QR code updates in real-time to include the contact information corresponding to the selected visual indicia. The contact information is stored as a URI-encoded serialized data object in a parameter portion of the URI of the QR code.

7 Claims, 4 Drawing Sheets

50 — displaying on a screen of a mobile device a first and second data field, wherein the first data field includes a QR code and the second data field includes a plurality of visual indicia corresponding to contact information corresponding to a user of the mobile device 51 — visually distinguishing on the screen at least one selected visual indicia from at least one unselected visual indicia upon receiving an input corresponding to a selection of the at least one visual indicia by the user 52 — updating in real-time the QR code to include the contact information corresponding to the selected visual indicia

FIG. 5

60 — displaying for a first mobile device a QR code derived on a second mobile device, wherein the second mobile device is configured to display the QR code including contact information corresponding a plurality of visual indicia selected by a user of the second mobile device, wherein the QR code corresponds to a URL containing the contact information, wherein the contact information corresponds to the user of the second device 61 — importing the contact information to a contacts database on the first mobile device

SYSTEM AND METHOD FOR GROUPING AND SHARING SOCIAL MEDIA DATA

CROSS REFERENCE TO RELATED APPLICATION

This patent application is entitled to and claims the benefit of U.S. Provisional Patent Application No. 62/574,280, filed on Oct. 19, 2017, the disclosure of which is incorporated herein by reference in its entirety.

BACKGROUND OF THE INVENTION

Field of the Invention

Preferred and non-limiting embodiments are related to sharing of information on computer networks and social platforms.

Description of Related Art

Digital business cards, or contact cards, such as Virtual Contact Files (.VCF), have existed since the earliest iterations of display-equipped cell phones that were capable of storing and displaying contacts. With the advent of smartphones came the ability to send entire contact cards from one smartphone to another, so long as the recipient smartphone was of the same brand of operating system. Smartphone manufacturers, in a protectionist and exclusive approach to their market shares, have failed to ever introduce or adopt any sort of cross-platform support or standardization for the format of contact information. Beyond that, in the last decade, social networks have proliferated by the droves, ushering in a vast era of social networks needing user-specific contact information or profiles. The average person has presences on five social networking platforms, each with their various corresponding profiles, accounts, or similar faun of digital real estate. Current methods of sharing one's social media profile are generally limited to sending or exchanging one social profile at a time.

Although QR codes are a reliable manner with which to convey information, in the context of sharing contact information, a new QR code would need to be generated each time some aspect of one's contact information changes. Similarly, different social circumstances would dictate that different QR codes would need to be shared (e.g., one's Instagram portfolio may not be appropriate to share in the context of a business contacts exchange). A prior art QR code which doesn't provide for the ability to customize the information embedded therein efficiently with respect to sharing contact information in the context of different social circumstances or among different individuals is considered impractical. Prior art electronic business card solutions, including 2D barcodes, sometimes allow for transmission of collections of contact information but are limited to static, pre-defined combinations of content.

SUMMARY OF THE INVENTION

To overcome the deficiencies of the prior art, what is needed, and has not heretofore been developed, is a system and method for aggregating all of one's contact information (e.g., a phone number; an email address; a social media profile; an instant messenger ID; a website address, etc.) within one profile that can easily be shared with others, allowing them to more easily access the underlying contact information. Thus, for example, one's online social media profiles such as Facebook, Snapchat, and Instagram may be grouped and shared alongside other contact information like one's email address and phone number. One's social media presence may be visually presented and shared in a unified, yet still selective manner.

Generally provided is a computer readable medium having stored thereon instructions which, when executed by one or more processors of one or more computers, causes the one or more processors to execute steps of a method for sharing social media data, the method comprising the steps of (a) displaying on a screen of a mobile device a first and second data field, wherein the first data field includes a QR code and the second data field includes a plurality of visual indicia corresponding to contact information corresponding to a user of the mobile device; (b) visually distinguishing on the screen at least one selected visual indicia from at least one unselected visual indicia upon receiving an input corresponding to a selection of the at least one visual indicia by the user; and (c) updating in real-time the QR code to include the contact information corresponding to the selected visual indicia and, optionally, wherein the updated QR code corresponds to a URL containing the contact information. The contact information includes one or more of a phone number; an email address; a profile picture; a social media profile; an instant messenger ID; a website address; a username; a platform identification; cryptographic data; and reference to a digital asset.

A system for sharing contact information data includes (a) a first mobile device configured to display a QR code including contact information corresponding to a plurality of visual indicia selected by a user of the first mobile device, wherein the QR code corresponds to a URL containing the contact information, wherein the contact information corresponds to the user of the first mobile device; (b) a second mobile device configured to scan the QR code displayed on the first mobile device, wherein the second mobile device is configured to at least one of import the contact information to a contacts database on the second mobile device and open a corresponding application or website link on the second mobile device; and (c) a server for transmitting to the second mobile device a webpage displaying the contact information in response to receiving a query (e.g., HTTP) from the second mobile device. The contact information includes one or more of a phone number; an email address; a profile picture; a social media profile; an instant messenger ID; a website address; a username; a platform identification; cryptographic data; and reference to a digital asset.

The present invention includes an active QR code that changes in real-time based on the information that is intended to be shared. It is to be understood that while the preferred embodiment and use cases happen to be a QR code, these teachings can be applied to any machine-readable label, including 2D barcodes and radial codes. The active QR code still functions like a regular QR code passing along a set of data to a recipient of the code. The active QR code may change an infinite amount of times as every time one shares information, one determines what information will be shared. An active QR code is a single QR code that replaces thousands of static QR codes with the ability to change the information embedded therein. Thus, individuals may be able to send multiple pieces of user-specific data within a single bundle. This may include, but is not limited to, logo images and image paths in various sizes, network identifiers (e.g., fb is Facebook, p is phone number, n is name), application URL schemes for opening a profile within a corresponding application, and a website URL scheme for opening a profile on a corresponding social media site.

Some aspects of the present invention may be embodied in an application residing on a mobile device. Some functions may be performed wholly within the application without reliance on a client-server connection, whereas other functions may utilize the client-server connection. For example, as discussed below, if both client devices have the appropriate application installed thereon, then no communication with the server may be necessary to share the intended information.

It is to be understood that each communication platform or interface may have its own API, protocol, data formats or schema. Accordingly, the present invention provides for an open contribution system that allows new outside communication platforms, social networking platforms, payments or cryptocurrency mediums or blockchain, to add their own data formats into the system of the present invention such that they may be offered to users. While the one embodiment may allow for a file platform where the contact information includes a file or data encoded as Base64 and MIME type, another file platform may be added where the contact information includes an identifier or URL for the system to use to retrieve the file.

The application associated with the present invention may include an instant messenger or similar real-time communication tool. Such a tool may allow for collaboration with one or more users or groups of users via splitting payments, assigning tasks, or file sharing across similar and dissimilar platforms. Users can share anything from messages to PDFs, graphic files, and link-embedded videos and interactive content that can interact with an entire group of other users.

In one embodiment, the system and method provides for sharing information for locating and/or connecting to the user's various accounts, profiles, or representations on computer networks and social platforms.

These and other features and characteristics of the present invention, as well as the methods of operation and functions of the related elements of structures and the combination of parts and economies of manufacture, will become more apparent upon consideration of the following description and the appended claims, if any, with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, if any, the singular form of "a", "an", and "the" include plural referents unless the context clearly dictates otherwise.

DETAILED DESCRIPTION OF THE INVENTION

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. It is to be understood that the invention may assume various alternative variations and step sequences, except where expressly specified to the contrary. It is also to be understood that the specific devices and processes illustrated in the drawings, and described in the following specification, are simply exemplary embodiments of the invention. Hence, specific dimensions and other physical and/or processing characteristics related to the embodiments disclosed herein are not to be considered as limiting.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, routed, and the like, between the first and second unit or component. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

Figure 1:
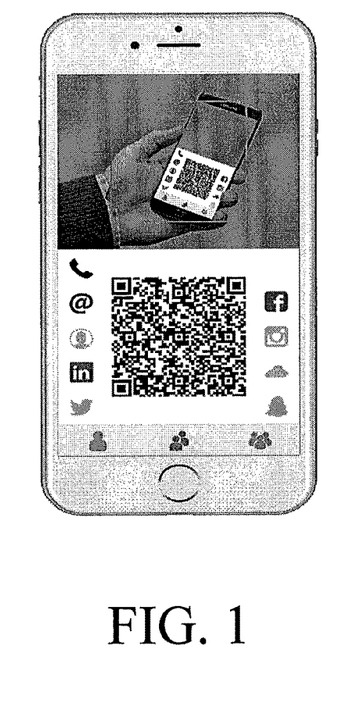
FIG. 1 depicts an application operating on a mobile device, in accordance with one embodiment of the present invention.

FIG. 1 depicts an application operating on a mobile device. The application may embody one or more principles of the present invention. Although the invention is described in the context of an application operating on a mobile device, it is to be understood that the principles of the invention may be embodied natively within a device and/or its operating system. Additionally, the orientation and placement of various screen elements and fields may vary. Thus, the examples shown herein are not to be construed as limiting the scope of the invention. As shown in FIG. 1, the application includes a screen divided into two portions, with the top portion providing a camera interface configured to capture QR codes and the bottom portion containing an active or dynamic QR code. The toggles around the QR code are configured so that the user of the device may tap on them to determine if that specific piece of data will be shared or not. For example, a highlighted icon indicates that the selected contact information or underlying social media data will be shared. It is to be understood that other visual indicia may be used to designate what will be shared or not. As soon as a selection of any of the icons is made, the QR code is updated to represent the underlying data that is to be shared. One can share as much or as little contact information and the QR code will reflect the choices accordingly. It is to be understood that contact information may include any information that is used to make contact with or identify an entity (e.g., human, electronic, tangible, intangible, etc.); and data that an entity, device, or system controls and can share. The application may also include ancillary features such as a connection history screen that shows what information the user shared or what information was shared with that user. The icons displayed adjacent to the QR code may be situated in scrollable fields to accommodate additional icons that may not all fit within the screen at the same time.

In an embodiment where use of a selected unit of information in the QR code requires authorization, the active QR will require the user to authenticate with one or more security mechanisms including but not limited to two factor authentication, biometric identification, sensor data, and hardware authentication. In an embodiment where a digital signature is required, the user may be required to allow access to cryptographic keys, an external service may be used for validation and authorization, or a challenge and response sequence may be initiated where one or both devices must cryptographically sign or hash data generated by the other device as verification. It is to be understood that one or more components of information comprising the QR code may be synchronized with external resources such as application extensions, APIs, or communications to connect with the receiving device, such as by acting as a host or long polling a controlling host.

Figure 2A:
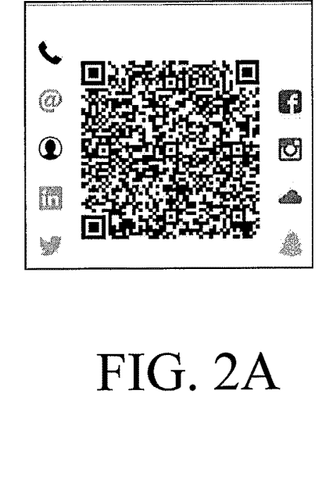
FIGS. 2A-2C are screen shots depicting a dynamic QR code based on different social media contact information selections in accordance with one embodiment of the present invention.
Figure 2B:
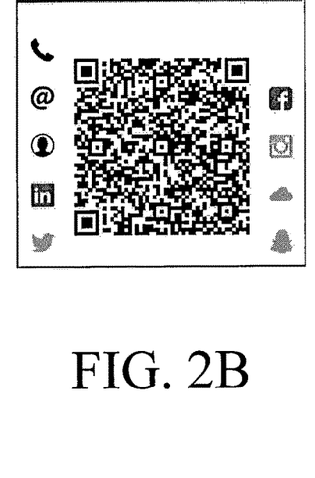
Figure 2C:
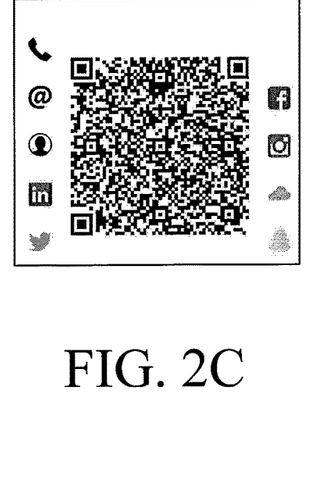

FIGS. 2A-2C are screen shots depicting a dynamic QR code based on different social media contact information selections. As shown in FIG. 2A, the user has selected contact information or other data including their phone number, profile picture, Facebook, Instagram, SoundCloud, and Snapchat as the items to be shared. In FIG. 2B, the user has selected their phone number, email address, profile picture, LinkedIn, and Facebook as the contact information items to be shared. In FIG. 2C, the user has selected their phone number, email address, profile picture, LinkedIn, Facebook, Instagram, and Snapchat as the contact information items to be shared. As shown, the respective QR codes are different in each of the aforementioned figures based on the data that is embodied therein. The information encoded in the image of the QR code represents dynamic data, as derived from a data string that itself is dynamically modified based on the selections by the user. This data string may be converted to a URL, which then forms the basis of the QR code. Alternatively, the QR code may include other data formats having the selection embedded therein. An image container/controller listens for changes to data and updates the QR code image upon a data change event. This dynamic, real-time QR code still functions like a regular QR code passing along data to the recipient of the code. As shown, in FIG. 1, another user, utilizing his own device may point the device's camera at the screen of the device containing the dynamic code and the QR code can then be copied and/or translated into human-readable data on the other user's device. Alternatively, the user who created the QR code may send the underlying data of the QR code to another user as a URL, via SMS messaging, email, wireless communication (e.g., Bluetooth, NFC, or other radio communications), or other transport medium if the intended recipient does not have the capabilities of receiving or translating the QR code, either via a native function or proprietary application on their device. If both users have the same application that created the QR code, then the QR code may be easily exchanged through the protocols associated with such an application.

Figure 3:
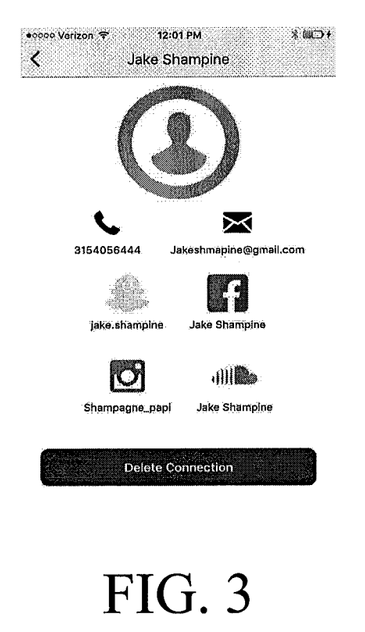
FIG. 3 is a screen shot depicting a single profile containing a plurality of contact information in accordance with one embodiment of the present invention.

As shown in FIG. 3, the captured QR code can be translated into a single profile containing a plurality of contact information. This single profile may appear in a designated application of the other user's device where that user may add the newly received profile to a database of other profiles. For example, a phone number and profile picture may be imported into the existing contacts database on the device. Alternatively, the activation of a phone number displayed within the profile may result in the device calling that number. Furthermore, if any of the contact information that is embodied as a social media profile is selected, a corresponding application (e.g., if already installed on the device) or website link will be opened to allow the user to view the respective online social media profile. The user may also edit or delete any of the profiles and/or individual contact information may be deleted within each profile. Alternatively, if a corresponding URL is received instead of the QR code, then following that URL will result in a webpage to be displayed in a browser associated with the device. The webpage may be created by a server that interprets the URL in response to receiving the associated HTTP query (or other query) from the device, wherein the server then creates, in real-time, a webpage (e.g., landing page) showing the contact information stored within the URL (which corresponds to what was previously selected in the context of the dynamic QR code). Thus, the webpage may be a corresponding contact information page for the user who initially shared their information. Different URLs may result in different webpages depending on the content of the URL. The user who is viewing the webpage can then select any of the contact information displayed on the webpage and import it into their own phone and/or follow any links to the respective online social media profile. If the user has the appropriate applications, the links may be intercepted and the corresponding application may be opened on the device, instead. Alternatively, a link to the application that can generate the dynamic QR code may be on the webpage such that when the link is followed, the application may be installed and the contact information from the webpage may be loaded into the application as a new profile.

The present invention may be utilized in both social and professional contexts. Active QR codes may be used in place of or in connection with V-cards (e.g., electronic business or personal cards that can be attached as files to emails, texts, etc.). Prior art V-cards adhere to an industry specification that limits the amount of contact details and are not extensible to the extent that social media contact information evolves. Additionally, prior art V-cards are in the form of actual files that make sharing thereof less convenient. In a workplace environment, permissions may be set that dictate what social media contact data may be shared with others via active QR codes. It is to be understood that the active QR codes may be implemented in other applications and scenarios. For example, today in almost every store in shopping malls employees carry around some sort of tablet or other mobile device. It is possible to customize QR codes in real-time to each shopper's individual needs. It doesn't matter if it's a man or women, shopping for shorts, shirts or maybe even shoes. One has the ability to customize each coupon to fit the needs of every shopper. Utilizing preset information inside of each toggle icon around the QR code, a store could have preset toggles around the QR allowing employees to customize scannable QR codes or even be able to create URL links to send to the shoppers via SMS or email where they can then access it. Creating a coupon that is applicable to everyone who enters a place of business can substantially drive higher sales. The customer may also use the QR system to transact payments, wherein encrypted or tokenized payment method data, such as credit card, voucher, cryptocurrency, or Paypal® information, may be selected by the user toggling or selecting the desired method. The user may authenticate with their payment provider by PIN or biometric identification, at which point the Active QR conveys one-time-use payment details and cryptographic signature as updated by the payment provider. Alternatively, the user could request payment method and authorization from another user remotely, such as a minor purchasing shoes that a parent is paying for, or an employee making a purchase on behalf of their employer.

Another scenario that many of us face but still have problems with is mobile boarding passes. For example, if one flies from Phoenix to New York City and one has a layover, one has to download two mobile boarding passes, with the second one providing difficulty in downloading. The active QR code may deliver one mobile boarding pass for all and by changing the destination from flight to flight, the QR code will change on the mobile boarding pass in real-time. Thus, there will no longer be issues with searching through boarding passes to make sure that one has the correct one, as an ultimate boarding pass is created through use of the active QR code. A similar scenario is that of ticketing, whereas oftentimes, for a group to sit next to each other at an event, all tickets must be purchased at the same time by one person. However, oftentimes people take different transportation to the same event, or arrive at different times. A single Active QR in this context could consist of many individual tickets which a User could then distribute individually to the other attendees so that they may have their own ticket on their own device. The Active QR containing the several tickets of the original purchase updates automatically as individual tickets are distributed or used.

It is to be understood that the active QR code described herein may be transferred or copied to printed or other physical, non-electronic media and may then be scanned therefrom in accordance with the present invention.

As is known in the art, URLs have been utilized for some 20+ years as a fundamental address format for clients locating specific files, via internet connection, hosted remotely on servers. URLs contain various standard components, all of which serve purposes in directing the server to the requested file, resource or node. The extent of URL usage, up unto this time, is as a static coordinate and does not transmit data not already contained on the server.

The present invention may utilize a URI-encoded Serialized Data Object for purposes of transmitting shared social media data or contact information. This URI-encoded serialized data object may be either 2-dimensional or 3 dimensional and can be encoded as a URL. The URL has two root parts, the domain and the parameters, separated by "?", as is standard for URLs. The domain part can reference a website/page/application or can have a custom scheme used to identify the data type. The parameter part contains the data as URL parameters after the separator ("?"). Parameters are appended in the form "key=value" where the value is URI encoded. An implementation of this strategy can be predefined to be 2D or 3D or require a URL parameter specifying the nature of the object.

The capabilities and purpose of traditional URLs is expanded to contain real datasets not familiar to the server, and in fact in many cases of specific value, does not require a server's presence or involvement whatsoever. The use of this URL is such that the URL stores datasets uniquely designated by the client, which can then equally do either or both of the following: (a) URL can be sent, via Internet connection, to a server which is not familiar with the data stored in the URL, but is able to identify a given template as the appropriate apparatus to send back to the client in order for the client to be presented with the data in a usable format. A usable format for the decoded data object may have the data presented to the user as simple text, or a hyperlink, or any number of other objects; or (b) be sent from one client, via Internet connection, to another client, without ever having to be passed through a server, nor require interaction from a server, and still be presented to the receiving client, in a usable format, such as a hyperlink, or even something as simple as text. This usage scenario presumes the receiving user is already in possession of an appropriate URL Encoded Data Object Presenter which enables decoding of the data contained in the URL, allowing the data object to be presented to the user in a usable format, such as a hyperlink, or even something as simple as text, without any interaction or involvement from a remote server. This allows for users to create, share, and make full use of a URL Encoded Data Object without any Internet connection whatsoever.

This method of Encoding Data Objects into URLs allows for storage and transmission of non-trivial, complex, multi-dimensional data within a URL's standard components, such as, but not limited to, a URL's parameters. This data encoded into a URL can be encoded and packaged client-side, and can equally be decoded and presented for use on the client-side as well, assuming a client has a URL Encoded Data Object Presenter application for this purpose. The client is equally capable of sending this data encoded URL to a server, which would simply respond to the request by sending relevant URL Encoded Data Object Presenter components back to the client so that the client-side device could then decode the data stored in the URL. There is never data processing required server-side, but only locally on a client's device via the URL/URI Encoded Data Object Presenter.

The URL/URI Encoded Data Object is a way of storing and sharing non-trivial, complex, and/or multidimensional data within a traditional URL format; the benefit of this is versatility of the data, and lack of dependence on Internet connectivity in order for a user to share, or make use of, the encoded data objects. The method by which the data is stored centers around expanded use of alphanumeric character and symbol codes within the URL's standardized segments, such as the parameters. A specific piece of data would be preceded by a marker including designated, pre-specified character combinations which the URL/URI Encoded Data Object Presenter is scripted to recognize in anticipation of a piece of data following the marker. A designated, prespecified character or symbol follows the end of the data as well in order to indicate to the URL/URI Encoded Data Object Presenter that that string of data is complete. The start-data and stop-data indicators may be changed for a user's given purpose as well, so long as this is communicated via further data encoding which would precede the datasets within the URL parameters in order to indicate to the receiving URL Encoded Data Object Presenter which start-data and stop-data indicators will be utilized in that particular URL.

As is known in the art, a URL is formatted as follows: <scheme>://<username>:<password>@<host>:<port>/<path>;<parameters>?<query>#<fragment>. Data within the present invention may be encoded into the parameters portion of the URL. The standard URL components may remain, with the exception of the parameters. An example may be: <scheme>://<username>: <password>@<host>:

<port>/<path>;<&% encoded % ?a=1?b=2?c=3%endencoded%>?<query>#<fragment>, where (a) &—indicates to the receiving URL Encoded Data Object Presenter that it is now entering the Parameter of the URL; (b) % encoded%—indicates to the receiving URL Encoded Data Object Presenter that the remainder of the parameters directly subsequent to this indicator will be encoded data. This indicates the beginning of the substance of the data object; (c) ?—indicates to the receiving URL Encoded Data Object Presenter that the subsequent character will be the first character in the title of an isolated piece of data; (d) a—indicates to the receiving URL Encoded Data Object Presenter the title of this piece of data; (e)=—indicates to the receiving URL Encoded Data Object Presenter that the following data will represent the value assigned the title directly preceding this symbol; (f) 1—indicates to the receiving URL Encoded Data Object Presenter the value assigned to the title preceding the '=.'; and (g) % endencoded %—indicates to the receiving URL Encoded Data Object Presenter the conclusion of the encoded dated segment of the URL. Equal symbols may be used to separate all values removing ambiguity. Furthermore, multiple instances of a field may be interpreted as separate arrays. This allows for an additional dimension to the data. This is intended to be used to allow for data points that have multiple pieces of information (e.g., Slack identification requires a team name and a user name). Additionally, semi-colons may be used, as permitted in URLs conforming to RFC 2396 (Request for Comments 2396 authored by BERNERS-LEE et al. and titled "Uniform Resource Identifiers (URI): Generic Syntax", published August 1998).

In one embodiment, a key-value pair, wherein the value is a list within a data object, is represented as a key with values of the list separated by equal symbols, distinct collections of lists separated by repeated key-value pairs in the form as follows: key1=value %20one=value%20two=value%20three&key1=val%20four=val%20five This form of using reserved symbols to enumerate and define keys and values at various depths and levels of separation can represent data objects with nesting depth less than a pre-defined maximum depth. In another embodiment, certain reserved symbols denote increase or decrease in depth while other symbols denote data type such as list or value and can be used for data objects of arbitrary nesting depth. An example of this may be where the semicolon is used to denote decrease of 1 level in depth, while the equal symbol denotes an increase of 1 level in depth and the plus symbol separates list elements. Some embodiments may use recursively encoding values to denote nesting depth allowing for arbitrary nesting depth. For example, a key-value pair may be URL encoded as a value for another key and the resulting key-value pair can be URL encoded as a value for a third key; this form can be repeated an arbitrary number of times to achieve arbitrary levels of nesting depth.

Figure 4:
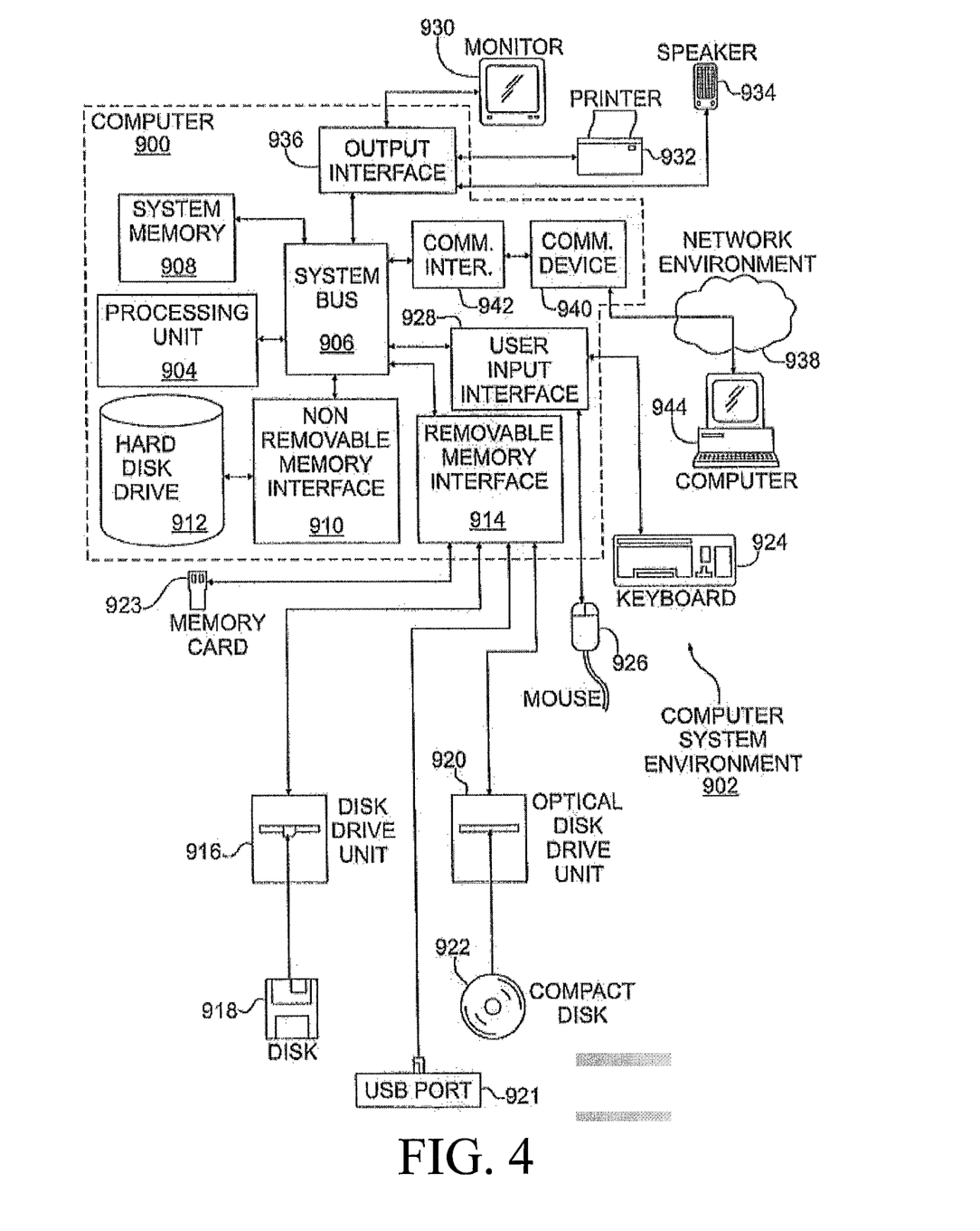
FIG. 4 is a block diagram of a computer system according to principles of the present invention.

The present invention, as discussed above, may be implemented on a variety of computing devices, servers, processing units, and systems, wherein these computing devices, servers, processing units, and systems include the appropriate processing mechanisms and computer-readable media for storing and executing computer-readable instructions, such as programming instructions, code, and the like. As shown in FIG. 4, computers 900, 944, in a computing system environment 902 are provided. This computing system environment 902 may include, but is not limited to, at least one computer 900 having certain components for appropriate operation, execution of code, and creation and communication of data. For example, the computer 900 includes a processing unit 904 (typically referred to as a central processing unit or CPU) that serves to execute computer-based instructions received in the appropriate data form and format. Further, this processing unit 904 may be in the form of multiple processors executing code in series, in parallel, or in any other manner for appropriate implementation of the computer-based instructions.

In order to facilitate appropriate data communication and processing information between the various components of the computer 900, a system bus 906 is utilized. The system bus 906 may be any of several types of bus structures, including a memory bus or memory controller, a peripheral bus, or a local bus using any of a variety of bus architectures. In particular, the system bus 906 facilitates data and information communication between the various components (whether internal or external to the computer 900) through a variety of interfaces, as discussed hereinafter.

The computer 900 may include a variety of discrete computer-readable media components. For example, this computer-readable media may include any media that can be accessed by the computer 900, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in other transport mechanisms and include any information delivery media, wired media (such as a wired network and a direct-wired connection), and wireless media. Computer-readable media may include all machine-readable media with the possible exception of transitory, propagating signals. Of course, combinations of any of the above should also be included within the scope of computer-readable media.

The computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory 908 typically contains data and program modules that are immediately accessible to or presently being operated on by processing unit 904, e.g., an operating system, application programming interfaces, application programs, program modules, program data and other instruction-based computer-readable codes.

With continued reference to FIG. 4, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD-ROM), a Universal Serial Bus (USB) port 921 for use in connection with a removable memory card, etc. However, it is envisioned that other removable or non-removable, volatile or non-volatile computer storage media can be used in the exemplary computing system environment 900, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 4 provide storage of operating systems, computer-readable instructions, application programs, data structures, program modules, program data and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 904 to execute, configure or otherwise implement the methods, processes, and transformational data manipulations discussed hereinafter in connection with the present invention. Still further, the computer 900 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

It will be apparent to one skilled in the relevant art(s) that the system may utilize databases physically located on one or more computers which may or may not be the same as their respective servers. For example, programming software on computer 900 can control a database physically stored on a separate processor of the network or otherwise.

Figure 5:
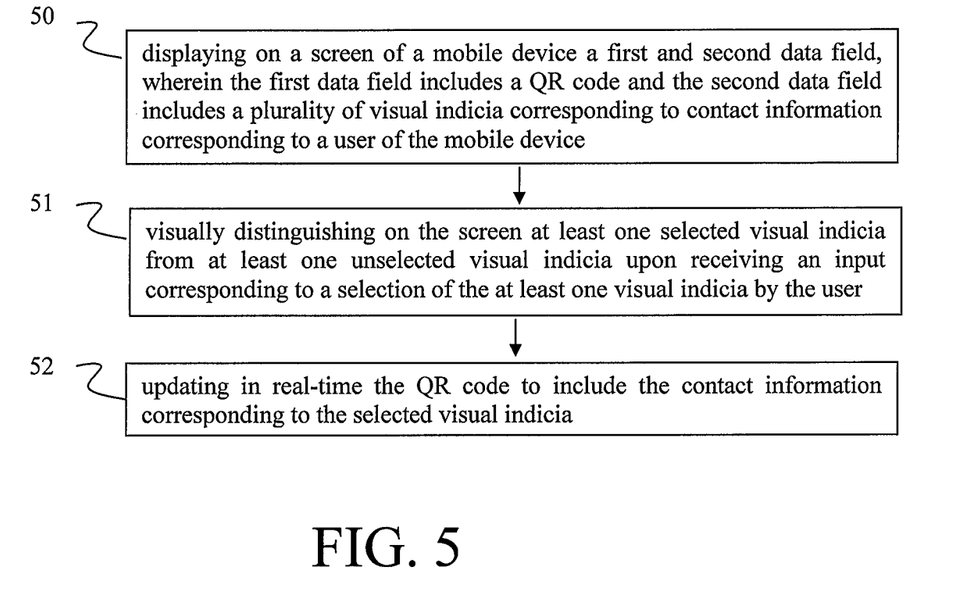
FIG. 5 is a flow diagram depicting a method of sharing contact information data in accordance with one embodiment of the present invention.

FIG. 5 is a flow diagram depicting a method of sharing contact information data in accordance with one embodiment of the present invention. Step 50 is directed to displaying on a screen of a mobile device a first and second data field, wherein the first data field includes a QR code and the second data field includes a plurality of visual indicia corresponding to contact information corresponding to a user of the mobile device. Step 51 is directed to visually distinguishing on the screen at least one selected visual indicia from at least one unselected visual indicia upon receiving an input corresponding to a selection of the at least one visual indicia by the user. Step 52 is directed to updating in real-time the QR code to include the contact information corresponding to the selected visual indicia and, optionally, wherein the updated QR code corresponds to a URL containing the contact information.

Figure 6:
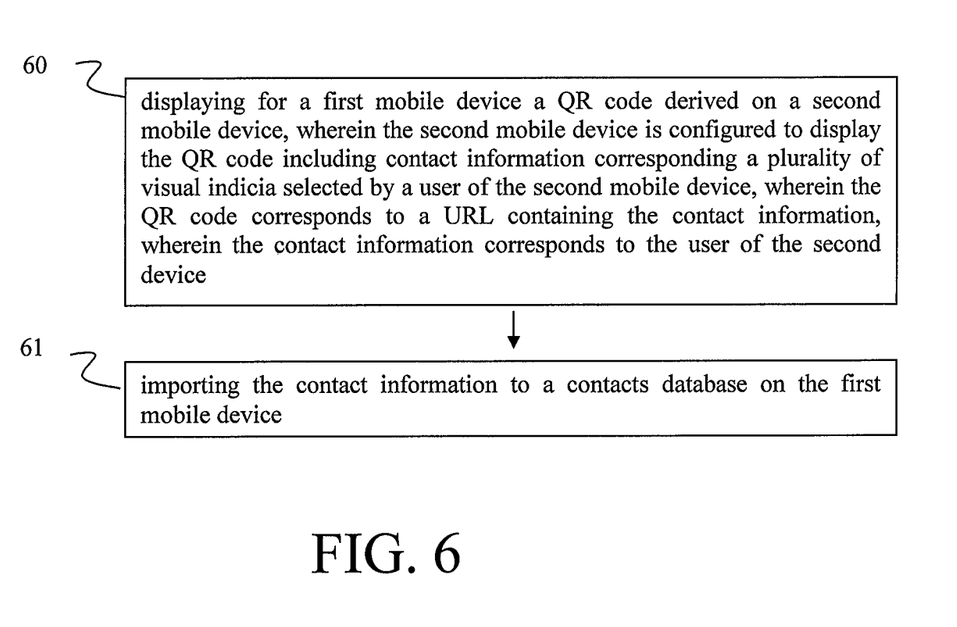
FIG. 6 is a flow diagram depicting a method of sharing contact information data in accordance with another embodiment of the present invention.

FIG. 6 is a flow diagram depicting a method of sharing contact information data in accordance with one embodiment of the present invention. Step 60 is directed to displaying for a first mobile device a QR code derived on a second mobile device, wherein the second mobile device is configured to display the QR code including contact information corresponding a plurality of visual indicia selected by a user of the second mobile device, wherein the QR code corresponds to a URL containing the contact information, wherein the contact information corresponds to the user of the second device. Step 61 is directed to importing the contact information to a contacts database on the first mobile device.

Although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims, if any. For example, it is to be understood that the present invention contemplates that, to the extent possible, one or more features of any embodiment can be combined with one or more features of any other embodiment.

What is claimed:

1. A non-transitory computer readable medium having stored thereon instructions which, when executed by one or more processors of one or more computers, causes the one or more processors to execute steps of a method for sharing contact information data, the method comprising the steps of:
    displaying on a screen of a mobile device a first and second data field, wherein the first data field includes a QR code and the second data field includes a plurality of visual indicia corresponding to contact information corresponding to a user of the mobile device;
    visually distinguishing on the screen at least one selected visual indicia from at least one unselected visual indicia upon receiving an input corresponding to a selection of the at least one visual indicia by the user; and
    updating in real-time the QR code to include the contact information corresponding to the selected visual indicia, wherein the QR code includes a URI conforming to a URI standard set forth in RFC 2396, wherein the URI standard includes a domain portion and a parameter portion, wherein the parameter portion includes a URI-encoded serialized data object containing underlying data representative of the contact information corresponding to the selected visual indicia.

2. The computer readable medium of claim 1, wherein the domain portion of the updated QR code corresponds to a URL containing the contact information.

3. The computer readable medium of claim 1, wherein the contact information includes one or more of:
    a phone number;
    an email address;
    a profile picture;
    a social media profile;
    an instant messenger ID;
    a website address;
    a username;
    a platform identification;
    cryptographic data; and
    reference to a digital asset.

4. A system for sharing contact information data, the system comprising:
    a first mobile device configured to display a QR code including contact information corresponding to a plurality of visual indicia selected by a user of the first mobile device, wherein the QR code includes a URI conforming to a URI standard set forth in RFC 2396, wherein the URI standard includes a domain portion and a parameter portion, wherein the parameter portion includes a URI-encoded serialized data object containing underlying data representative of the contact information corresponding to the selected visual indicia, wherein the contact information corresponds to the user of the first mobile device; and
    a second mobile device configured to scan the QR code displayed on the first mobile device, wherein the second mobile device is configured to decode the encoded serialized data object of the parameter portion of the URI using an encoded data object presenter, wherein the second mobile device is further configured to at least one of import the contact information to a contacts database on the second mobile device and open a corresponding application or website link on the second mobile device.

5. The system of claim 4, wherein the contact information includes one or more of:
    a phone number;
    an email address;
    a profile picture;
    a social media profile;
    an instant messenger ID;
    a website address;
    a username;
    a platform identification;
    cryptographic data; and
    reference to a digital asset.

6. A method for sharing contact information data, the method comprising the steps of:
    displaying for a first mobile device a QR code derived on a second mobile device, wherein the second mobile device is configured to display the QR code including contact information corresponding a plurality of visual indicia selected by a user of the second mobile device, wherein the QR code includes a URI conforming to a URI standard set forth in RFC 2396, wherein the URI standard includes a domain portion and a parameter portion, wherein the parameter portion includes a URI-encoded serialized data object containing underlying data representative of the contact information corresponding to the selected visual indicia, wherein the contact information corresponds to the user of the second device; and
    importing the contact information to a contacts database on the first mobile device.

7. The method of claim 6, wherein the contact information includes one or more of:
    a phone number;
    an email address;
    a profile picture;
    a social media profile;
    an instant messenger ID;
    a website address;
    a username;
    a platform identification;
    cryptographic data; and
    reference to a digital asset.

* * * * *